UNITED STATES PATENT OFFICE.

WILLIAM KURTZ, OF NEW YORK, N. Y.

METHOD OF PRODUCING PHOTOGRAPHIC PICTURES.

SPECIFICATION forming part of Letters Patent No. 225,478, dated March 16, 1880.

Application filed November 6, 1879.

*To all whom it may concern:*

Be it known that I, WILLIAM KURTZ, of the city, county, and State of New York, have invented certain new and useful Improvements in Producing Photo-Pictures, of which the following is a specification.

It has been the aim of photographers to produce negatives in which the sharp outlines of the object to be photographed are brought out in softer manner. Various methods have been employed to accomplish this result, such as placing the camera on springs and oscillating the same during exposure, thus imparting a vibratory movement to the sensitized plate; or by dulling the outlines of the negatives in printing by the interposition of a glass plate between the negative and photo-paper, or by taking the sitter out of focus. All these devices, however, have given no satisfactory results, so that the photographers had to rely to a greater or less degree on an artistic retouching of the negative. This latter, however, is time-consuming and expensive, and does not in all cases properly soften down the sharp contours, while frequently changing the expression.

My invention has for its object to furnish to photographers a simple and inexpensive method of producing softer portraits. This method is adapted to the varying conditions of the object and readily employed during a part or the entire time of exposure.

The invention consists in imparting motion to the body of air interposed between the object to be photographed and the camera for a part or the entire time of the exposure, the undulating motion of the air being obtained by the action of a suitable source of heat. The heat required for agitating the body or stratum of air between the object and camera may be produced either by a charcoal-furnace of oblong shape, or, preferably, a number of Bunsen gas-burners, which are arranged in one or more parallel lines. This source of heat is so arranged as to be lighted and interposed at the proper moment between the object and the camera without in the least disturbing the sitter. The heat of the charcoal-furnace or of the Bunsen burners causes that portion of the air vertically above the source of heat to undulate, so that the rays reflected from the object to the sensitized plate have to pass through this stratum or body of air in motion. As the rays are thereby prevented from acting in as sharp and effective manner on the sensitized plate, the contours of the resultant pictures become less hard and pronounced, and can be softened down to any extent. This softening can be graduated according as the features of the sitter are smooth or sharp or the sitter is young or old. The smoother the features of the object the shorter has to be the time of agitation of the heated air-stratum, while the sharper and older the features, or the more freckled, pock-marked, or wrinkled the faces, the longer has to be the time of using the undulating air-stratum during exposure.

By this method a better and more artistic negative is produced, as to the quality of the flesh and hair, and far superior to that found in the old style of negatives, which, if the sitter does not appear to be moving, are apt to be "wiry," "strawy," and "patchy;" also by this method pictures are obtained which are, as the term is, "more together," "better balanced," and "more composed." Besides this, negatives taken by my method can be retouched in half the time required by the present negatives.

Having thus described my invention, I claim as new and desire to secure by Letters Patent—

The method herein described of producing photographic pictures, which consists in agitating, by artificial means, the body of air naturally present between the camera and object to be photographed during exposure, for the purpose of softening the resultant picture, as specified.

In testimony that I claim the foregoing as my invention I have signed my name in presence of two witnesses this 31st day of October, 1879.

WILLIAM KURTZ.

Witnesses:
HERRMANN BASCH,
GEO. W. LOUD.